United States Patent
Fuhrmann et al.

(10) Patent No.: US 8,685,558 B2
(45) Date of Patent: Apr. 1, 2014

(54) DRIVE BATTERY ASSEMBLY OF AN ELECTRIC, FUEL CELL OR HYBRID VEHICLE

(75) Inventors: Lutz Fuhrmann, Weitramsdorf (DE); Juergen Stein, Babenhausen (DE)

(73) Assignee: Valeo Klimasysteme GmbH, Bad Rodach (DE)

( * ) Notice: Subject to any disclaimer, the term of this patent is extended or adjusted under 35 U.S.C. 154(b) by 1119 days.

(21) Appl. No.: 12/498,538

(22) Filed: Jul. 7, 2009

(65) Prior Publication Data

US 2010/0009248 A1 Jan. 14, 2010

(30) Foreign Application Priority Data

Jul. 8, 2008 (DE) .......................... 10 2008 032 086

(51) Int. Cl.
*H01M 10/50* (2006.01)
*H01M 6/50* (2006.01)

(52) U.S. Cl.
USPC ............................ 429/120; 429/163; 429/168

(58) Field of Classification Search
USPC ............ 429/120, 82, 151, 156, 72, 157, 149, 429/153, 186
See application file for complete search history.

(56) References Cited

U.S. PATENT DOCUMENTS

| 6,087,038 A * | 7/2000 | Flament et al. ............... 429/120 |
| 2002/0177035 A1 * | 11/2002 | Oweis et al. .................. 429/120 |
| 2004/0142238 A1 * | 7/2004 | Asahina et al. ............... 429/176 |
| 2008/0305388 A1 * | 12/2008 | Haussman ..................... 429/120 |

* cited by examiner

*Primary Examiner* — Basia Ridley
*Assistant Examiner* — Caitlin Wilmot
(74) *Attorney, Agent, or Firm* — Howard & Howard Attorneys PLLC

(57) ABSTRACT

A drive battery assembly of an electric, fuel cell or hybrid vehicle has a plurality of battery cells (10), which are outwardly closed by their own individual cell housings (12) and are combined into a cell stack. At least one cooling fin (16) planarly abutting the cell housings (12) removes heat by way of coolant. Canals (28) for coolant are formed by the walls of the two-walled cooling fins (16) being distanced in sections.

20 Claims, 5 Drawing Sheets

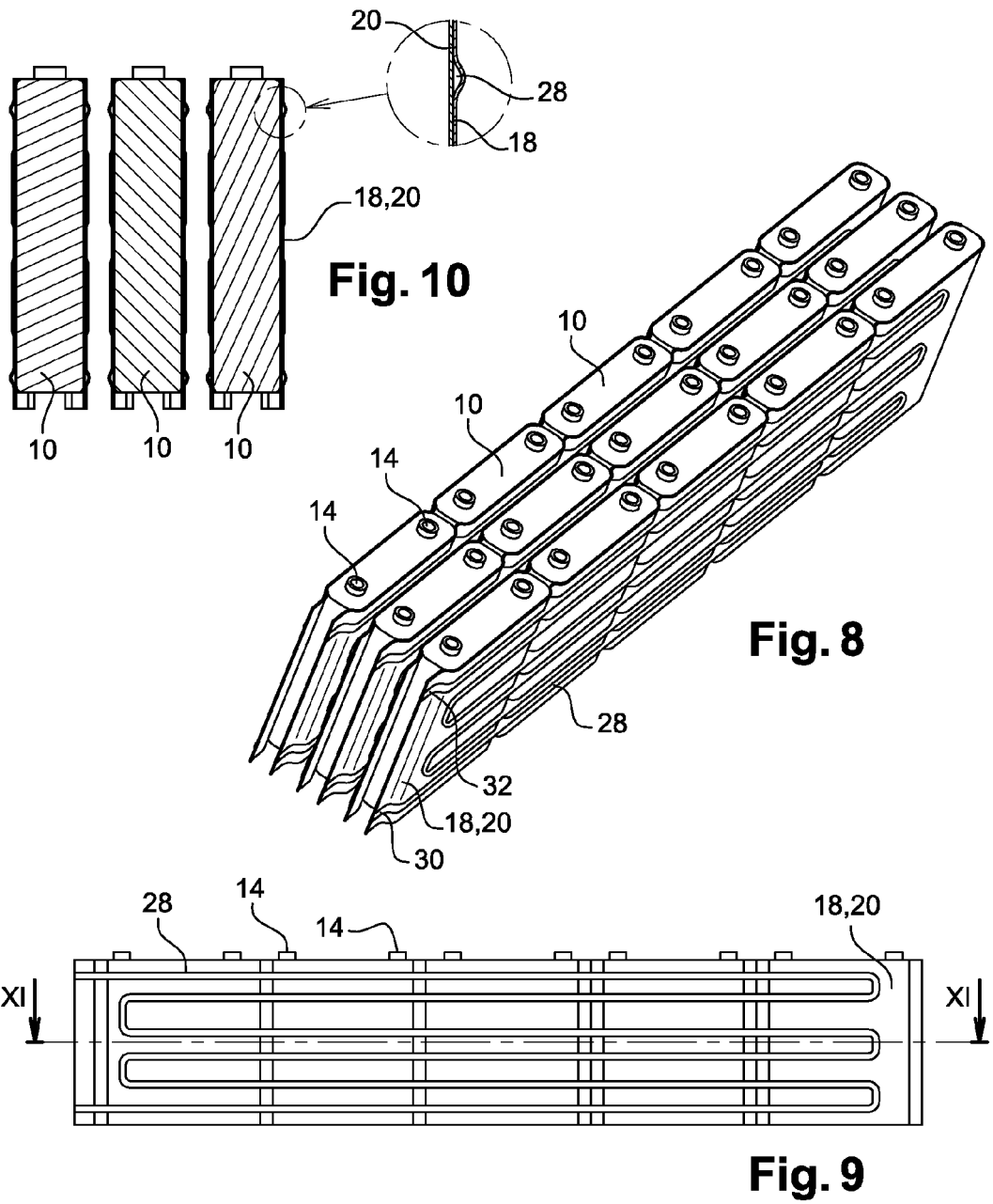

DRIVE BATTERY ASSEMBLY OF AN ELECTRIC, FUEL CELL OR HYBRID VEHICLE

RELATED APPLICATIONS

Figure 1:
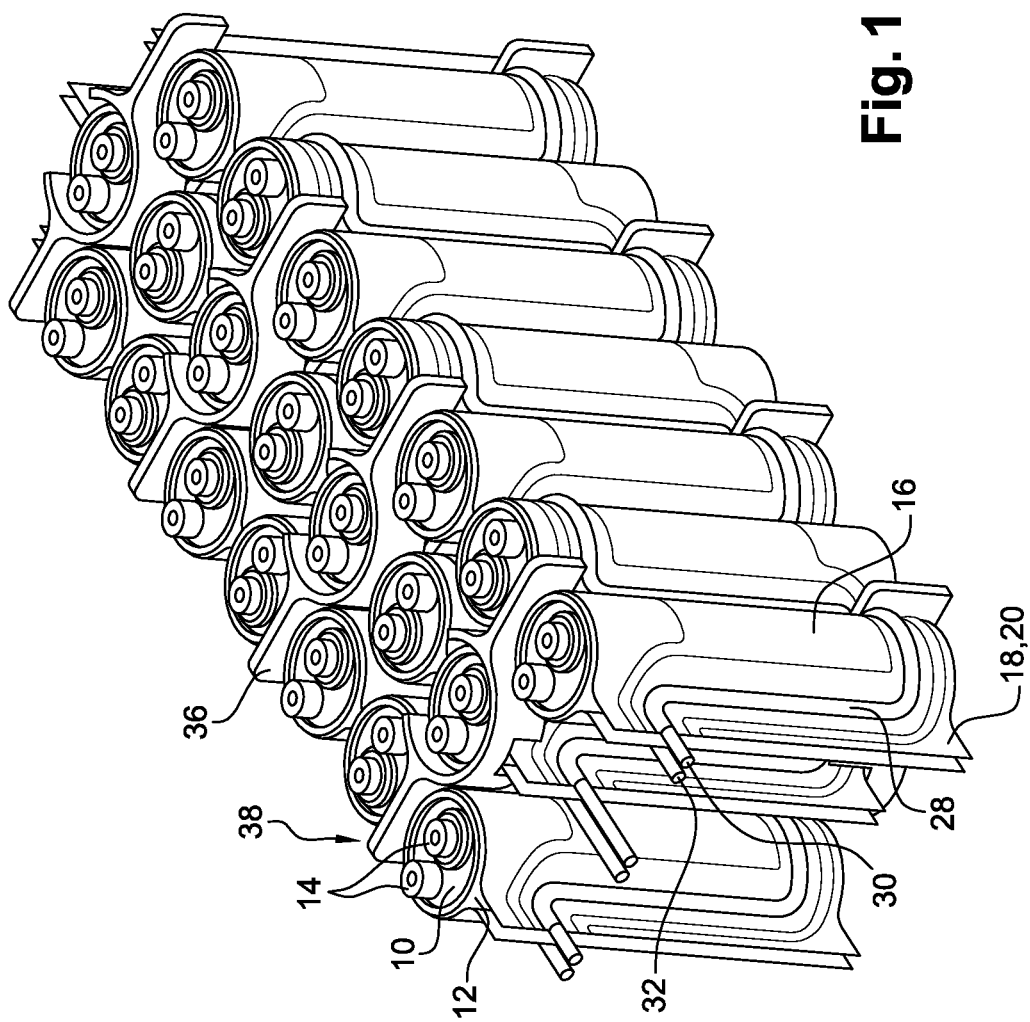

This application claims priority to and all the advantages of German Patent Application No. DE 10 2008 032 086.2, filed on Jul. 8, 2008.

The invention relates to a drive battery assembly of an electric, fuel cell or hybrid vehicle.

Such drive battery assemblies comprise a plurality of battery cells that are each externally enclosed by their own cell housing and are combined into a cell stack.

Owing to $CO_2$ pollution of the environment caused by pure internal combustion engines, the development of drives for vehicles for transporting people or goods is increasingly moving in the direction of electric drives to at least partially replace the internal combustion engines. The present invention relates to such drive battery assemblies for electric, fuel cell or hybrid vehicles. In such drive battery assemblies, pre-manufactured, externally closed battery cells are joined into a high-voltage battery (customary voltages of 130 volts for the so-called "mild" hybrids and 360 volts for a "full" hybrid) and combined in a common external housing. The battery cells are manufactured separately from each other and have their own metal exterior housing that is externally covered in plastic in order to ensure electric insulation. The battery cells are conventionally NIMH- or Li-ion battery cells that do not generate heat during the charging and discharging process. Nevertheless, these battery cells should not exceed their maximal cell temperature of 55° C. to 80° C. which would limit the lifetime of the cells. An inhomogeneous temperature distribution between the cells can also reduce battery cell life and thus the life of the entire assembly. It is therefore important to ensure that the temperatures between the cells does not differ by more than ±2 to 5 K, preferably by only ±2 to 3 K. Since the cells are electrically connected in series, one defective cell can lead to the complete failure of the entire battery assembly. Considerations have already been made regarding how to maintain the battery assembly at a constant temperature by means of an active fluid cooling system.

The invention creates a simple, space-saving, actively cooled drive battery assembly that can be manufactured cost effectively. It is furthermore an intention of the invention to guarantee the life of the battery assembly by ten years and more.

The invention moreover aims to effectively remove the partially accumulating energy amounts of 300 to 1500 watt, which are to be dissipated, without increasing the volume of the drive battery assembly.

This is achieved with the drive battery assembly of the type mentioned above by means of at least one cooling fin that planarly abuts the surface of the cell housing, said cooling fin being designed as having two walls, at least in sections, and sectionally distanced walls. The distanced region, that is to say the region with the distanced walls, forms a canal that guides a cooling fluid for removing heat energy of the battery cells. In the drive battery assembly according to the invention, pipes, which are not part of the drive battery assembly, are soldered on to thin sheet metal that is then formed into fins in order to remove heat therefrom, while the cooling fins themselves, rather, form the canal that guides the cooling fluid. This is achieved by the cooling fins having two walls, the walls being distanced only in sections in order to for one canal or a plurality of canals.

According to the invention, the cooling fin also has a mounting function for the battery cells in such a manner that less expenditure is required for the mounting of the battery cells. In particular, mounting racks, which are very complicated to construct and manufacture, into which the individual cells are inserted, can optionally be dispensed with. Moreover, the invention permits the achievement of a direct heat transfer from the fins into the cooling fluid since the canal wall is simultaneously the fin wall that abuts the cell housing.

According to the preferred embodiment, the cooling fin presses against the cell housing extensively. This is intended to achieve a play-free mounting of the cells and furthermore ensure that no insulating air gap exists between cell housing and cooling fin.

The cooling fin is intended to preferably hug the circumference of at least one cell housing by means of a press fit.

It is advantageous for optimal heat transfer and optimal mounting of the cells if the cooling fins abut the cell housing in the direction of the longitudinal axis of the battery cells over more than 90° of the periphery.

Moreover, at least 40 percent of the external peripheral surface of the cell housing altogether is in contact with one cooling fin or a plurality of cooling fins.

The mounting of the individual battery cells is optimized in that the battery cells are clamped between a plurality of cooling fins or cooling fin sections that engage opposing external peripheral sections of the cell housing.

The cell housings are, in particular, cylindrical, more particularly circularly cylindrical. The cooling fins extend in concertina arrangement on cells of one or different rows. This arrangement occurs from the perspective of the direction of the longitudinal axis of the cells.

The cooling fin or fins are formed in particular from two unshaped sheet metal sheets.

These sheet metal sheets can be connected to each other by material engagement (bonding, welding, soldering) or by shaping. It is naturally important that the connection is pressure-resistant in the regions of the canals.

A simple manufacture results when only one depression for forming the canal is created in only one of the sheet metal sheets. The other sheet metal sheet therefore need not be deeply wrought or deformed in the region of the canal.

The canal or canals extend in the longitudinal direction of the cells, in particular alternately upward and downward, in order to be able to remove at much energy as possible from the region of the corresponding cells.

A cooling fin preferably surrounds at least a plurality of cell housings of a row of battery cells and is curved in such a manner that it abuts the opposing section of the cell housings associated therewith.

For increasing heat transfer, a cooling fin is provided having more than two canal sections or canals that run alongside one another on one side of the cell housing. Two canal sections would be realized only between a feed and return line. In contrast, if one were to provide a large part of the surface of the fins with canal sections in concertina arrangement, which sections merge one with the other, or even with a plurality of canals, then a fin would result the contour of which is covered by pipes.

According to the invention, fastening means, plug in clamps in particular, can also be provided. These mutually fix opposing cooling fins or fin sections. These fastening means can be very easily and cost-effectively manufactured as well as mounted. It is not necessary that these fastening means also directly abut the cell housings. Rather, it is preferable that the fastening means contribute to the positional fixing of the cooling fins or fin sections, thereby ensuring and/or indirectly generating a clamping effect of the cooling fins on the battery cells.

The clamping elements furthermore serve as a support in a battery housing. The height of the clamping elements ensures a defined distance between the battery floors and the housing floor surface. This distance or clearance is required as so-called "bursting clearance".

The wall thickness of the fins is conventional between 0.1 and 2.5 mm, preferably between 0.5 and 1.5 mm.

In the assembly according to the invention, different fluids can be used as a cooling medium, for example a water-glycol mixture, R134a, CO2 such as 1234YF, for example, or other, alternative refrigerants.

The assembly according to the invention may have its own coolant circuit or can be connected to the coolant circuit of the motor vehicle, for example to that of the internal combustion engine.

The fins consist of aluminum, copper, or another very heat-conducting material that has, according to the preferred embodiment, a heat conductivity of 60 W/m/K to 400 W/m/K.

Figure 2:
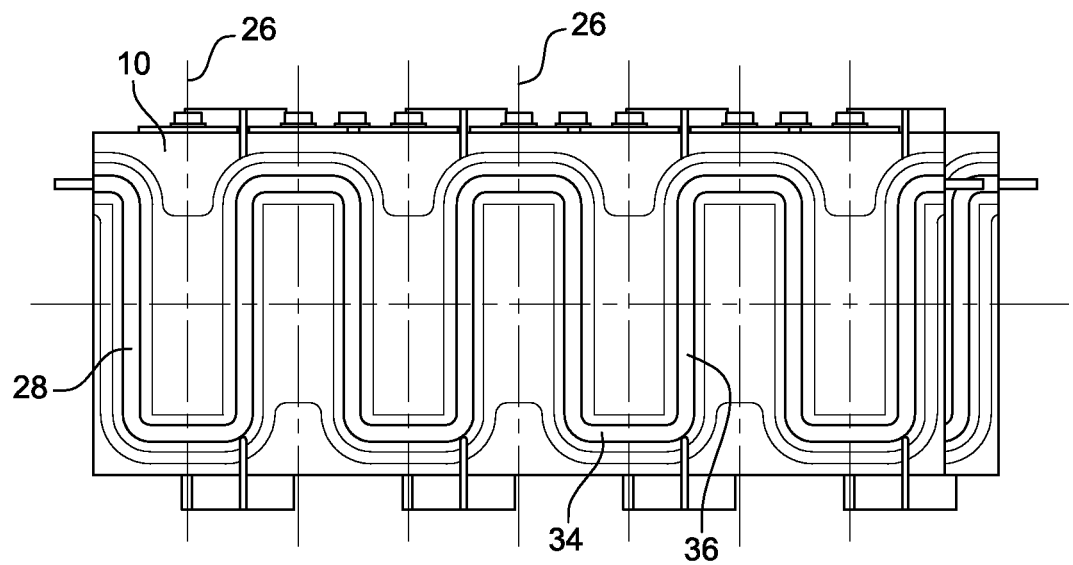
Figure 3:
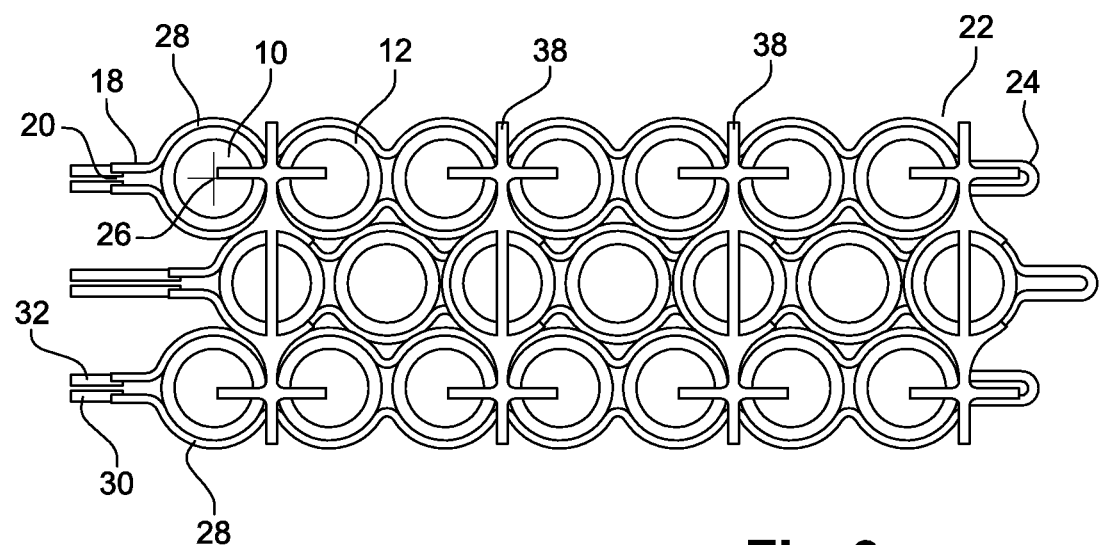
Figure 4:
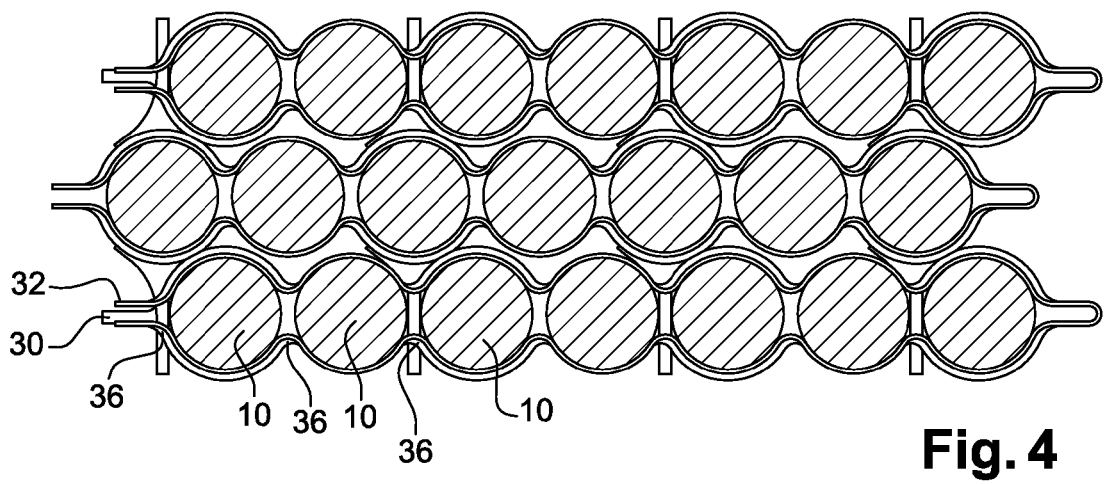
Figure 5:
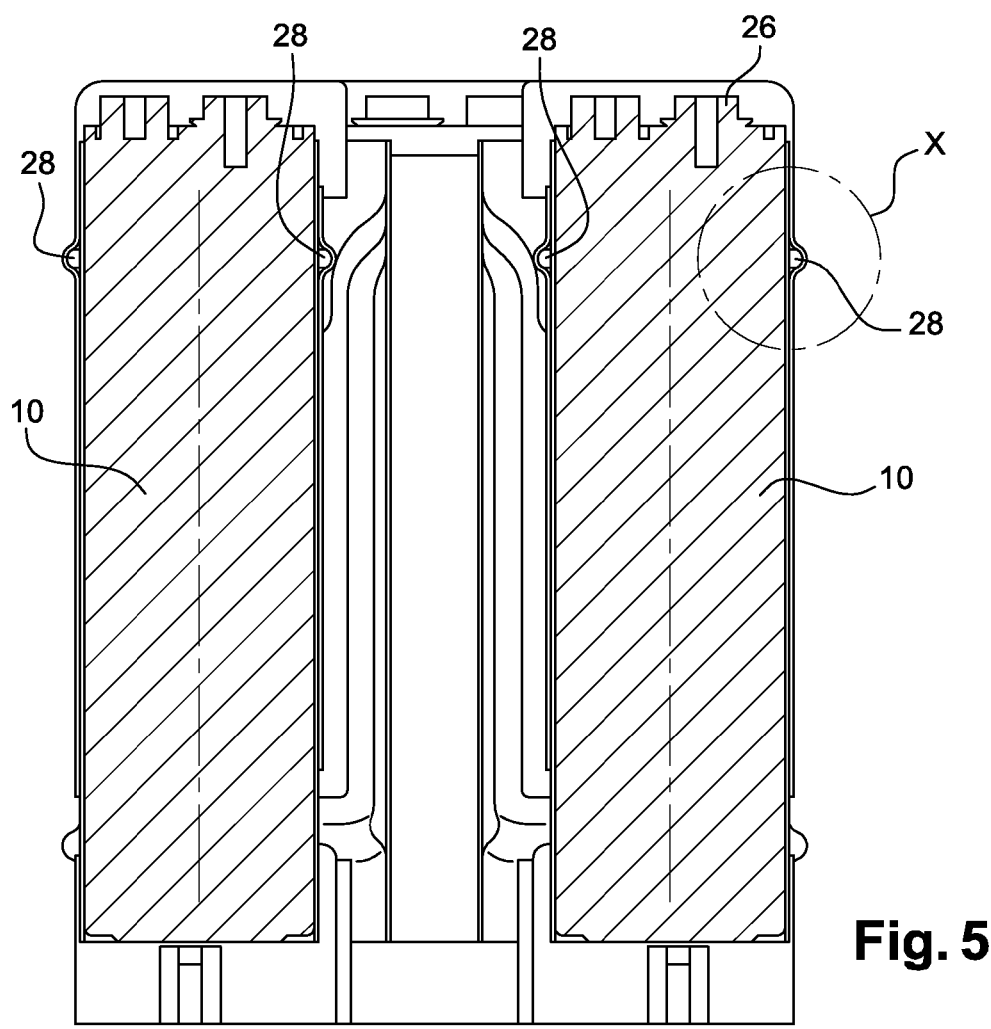
Figure 6:
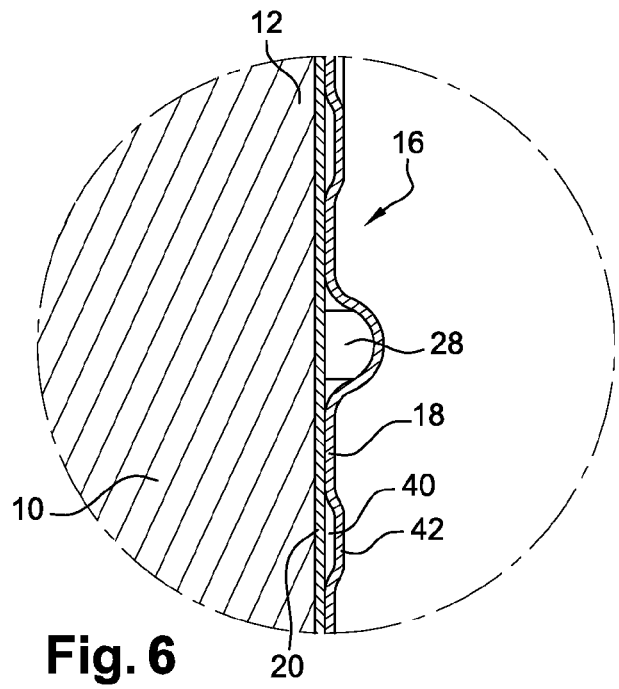
Figure 7:
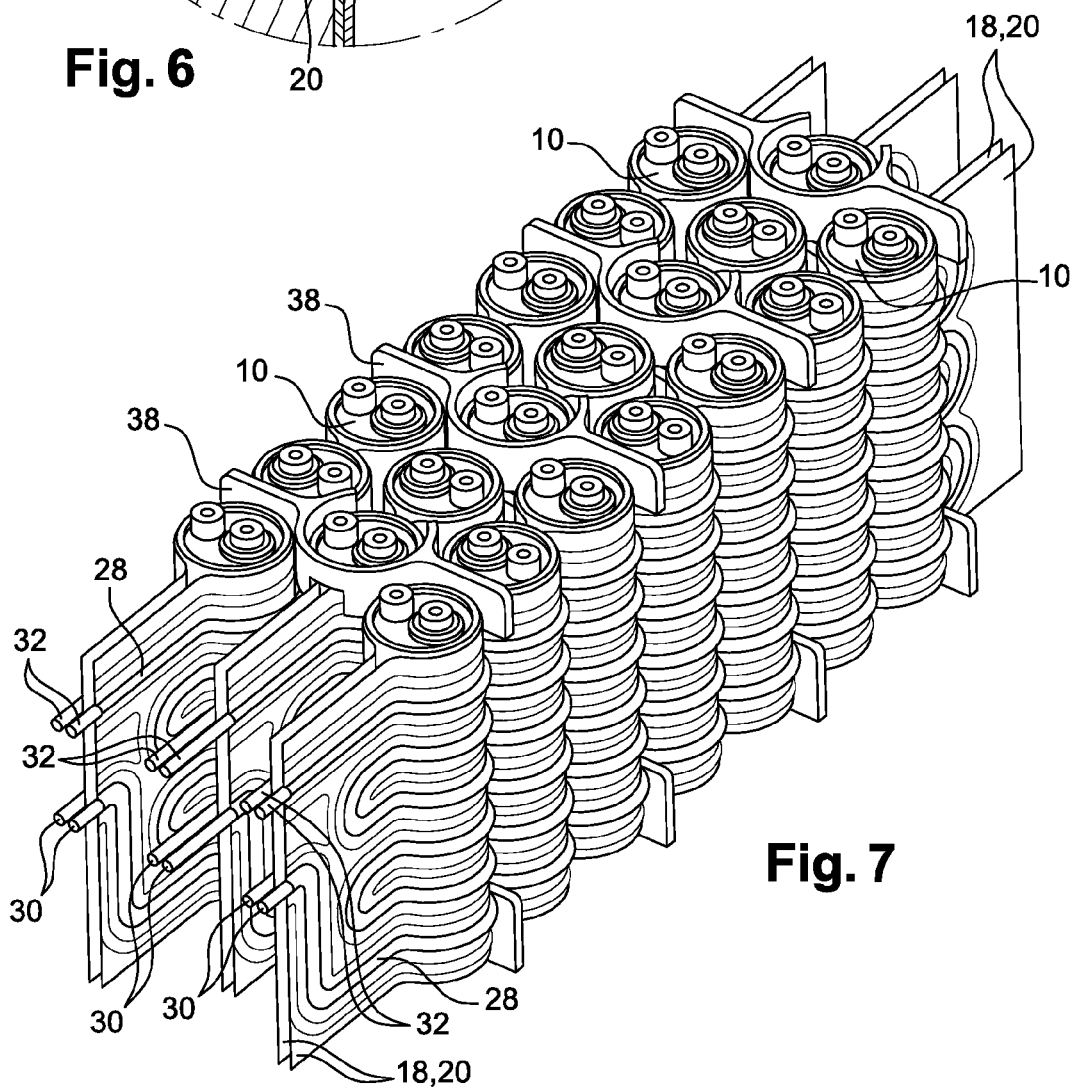

Additional features and advantages of the invention can be found in the following description and in the following drawings, to which reference made, the drawings showing in:

FIG. 1 a schematic perspective view of a first embodiment of the drive battery assembly according to the invention, FIG. 2 a side view of the drive battery assembly according to FIG. 1, FIG. 3 an elevational view of the battery assembly according to FIG. 1, FIG. 4 a horizontal sectional view of the battery assembly according to FIG. 1, FIG. 5 a longitudinal sectional view through two adjacent cell housings of the battery assembly according to FIG. 1, the cells being associated with adjacent rows, FIG. 6 an enlarged detail view of bordered region in FIG. 5 marked with an X, FIG. 7 a perspective elevational view of a drive battery assembly according to a second embodiment of the invention, FIG. 8 a schematic perspectival view of a further embodiment of the drive battery assembly according to the invention, FIG. 9 a lateral view of the battery assembly according to FIG. 8, FIG. 10 a cross-sectional view of the battery assembly according to FIG. 8, FIG. 11 a horizontal view of the battery assembly according to FIG. 8.

FIG. 1 shows a drive battery assembly of an electric, fuel cell or hybrid vehicle with an active cooling system. The assembly has an external housing that is not shown in the present case and is preferably composed of plastic. A plurality of battery cells 10 are housed in the external housing and are connected in series in such a manner that a high-voltage battery, more precisely a high voltage storage battery, is created. The individual battery cells 10 are NiMh-, Li ion batteries or the like and are contained in closed units that are each outwardly closed by individual cell housings 16. The external geometry of the cell housings 12 is preferably cylindrical, circularly cylindrical in particular. Poles 14 are provided on the upper side.

The battery cells 10 of the cell stack shown in FIG. 1 are arranged in three parallel rows in the embodiment shown, the middle row lying staggered by a half of a cell length to the two external rows in order to achieve greater packing density. FIG. 1 furthermore shows a cylindrical battery type as can be supplied from some battery manufacturers. It goes without saying that there are other battery manufacturers with different battery shapes. In the example shown in FIG. 8, it can be seen that the cooling principle shown therein can also be applied to different battery shapes (e.g. rectangular right parallelepiped).

The drive battery assembly shown is, as mentioned, is provided with an active cooling device, more precisely a cooling circuit. The cooling device comprises a plurality of so-called cooling fins 16. These cooling fins 16 are designed as double walled.

It can be seen in FIGS. 3 and 6 that the fins 16 have an external wall 18 and an internal wall 20 that are designed to have large surfaces, to run substantially parallel to each other and to even directly abut one another over a large surface area. The external wall 18 can substantially exhibit the same surface as the internal wall 20 or a considerably smaller surface.

A cooling fin 16 is provided per battery cell row 10 (FIG. 3 shows three rows) in the embodiment shown. These cooling fins 16 extend along the cell housings 12 in a concertina manner, from an elevational view, partially in the intermediate space between adjacent cell housings 12 from one cell housing 12 to one adjacent it. The cooling fins 16 are bent in a U-shape at the end 22 of each row of battery cells 10. The corresponding bent ends have reference number 24.

Two sections or arms of cooling fins 16 thus result. One arm abuts the exterior of the cell housings 12, while the other arm abuts the so-called interior. The interior is that side that points to the adjacent cell row and is positioned on the opposing side of the associated cell housings 12.

Alternatively, it is of course possible for one to speak of an inner and outer cooling fin 16 that are connected one to the other on one end 22 with corresponding diverter pipe curves 24. These connections are effected by material engagement (bonding, welding, soldering) or with a corresponding mechanical connection (e.g. screw connection, locking ring). In this manner, forward flow and reverse flow of the cooling medium also lies on one side of a battery cell row.

The cooling fins 16 thus position and retain the cells 10 of a row.

The cooling fins 16 are preferably positioned so that a large portion of their surface, if not their entire surface, abut the exterior of the cell housing 12, namely in such a manner that they press against the cell housing 12.

It is preferably provided that the cooling fins 16 hug the periphery of the cell housing 12 by means of a press fitting.

As can be seen in FIG. 3, the cooling fins 16 abut on each side of the periphery of the cell housing 12 at an angle of more than 90° from the perspective of the longitudinal axis 26 of the battery cells 10. In total, at least 40° of the exterior peripheral surface of each of the cell housings 12 is covered by one cooling fin 16 and in contact therewith.

Both of the walls 18, 20 of the cooling fins 16 planarly abut one another and are connected one to the other by means of a material engaging connection. Both of the walls 18, 20, however, are distanced from each other in sections in such a manner that at least one canal 28 is formed between the walks 18, 20 through which canal the coolant can flow in order to remove heat energy from the batteries.

These canals 28 are easily seen from a side view of the assembly in FIG. 2.

FIG. 1 furthermore shows that an inlet pipe 30 is attached on one arm of the cooling fin and that an outlet pipe 32 is attached on the other arm in the canal 28 in order to make individual connection possible on a cooling circuit.

In the embodiment shown, only one canal 28 actually extends upward and downward in the side view in a crenellation or concertina manner and, in sections, parallel to the longitudinal axis 26 of each of the associated battery cells 10.

Short connection sections 34 couple the upwardly and downwardly directed sections 36 of the canal 28.

The connection sections 34 (transverse canals across the batteries) can naturally also be arranged in a space-saving manner above or beneath the battery cells. This has the advantage that the coolant canals are not between the batteries and thus the batteries can be more closely positioned to one another.

A canal 28 extends on the other side of the battery cell row at the end 24 of the cooling fins (see FIG. 3).

According to the preferred, however not sole possible embodiment, the cooling fins 16 are formed from two unformed sheets of sheet metal that form the walls 18, 20.

It is preferable that only the external wall 18 is provided with a depression for forming the canal 28.

As can be seen particularly in FIGS. 2 and 4, each battery cell 10 is on one side associated with an upward and downward running section 36, a common section 36 being provided between adjacent cells 10 (see FIG. 4).

Fastening means 38 are provided in order to positionally fix opposing cooling fins 16 and fin sections (in this instance the arm of a cooling fin) (see FIGS. 1 and 3). These fastening means 38 are, in particular, plastic elements that are very easy to manufacture and can be attached to the assembly from above and/or below. The fastening means 38 may optionally engage only the cooling fins 16 or fin sections and can laterally pretension them in such a manner that the cooling fins 16 press against their associated battery cells 10 in a pretensioned manner and clamp them. The fastening means are preferably plug in clamps.

The pretensioning of the cooling sheet metals 16 on the battery cells 10 can of course be achieved by different functions such as, for example, by fastening or tensioning elements in the battery container or with a cover and base plate.

The two-walled design of the cooling fins 16 can be better seen in FIGS. 5 and 6. Small bumps 40 can also optionally be provided in the wall lateral to the canals 28 so as to create a gap 42 into which adhesive, solder or sealant for example, can be placed.

The gap 42 can, for production reasons, tolerances or the like, also be designed as such or similarly in order to not have the entire planar surface of both of the sheets of sheet metal touch one another but rather contact one another only at important locations, that is to say the gap 42 is not, or not only, present for receiving solder remains, adhesive remains etc.

The embodiment according to FIG. 7 substantially corresponds to that previously explained to the extent that only the differences need be explained in that which follows.

Upon closer inspection, one can see in the embodiment according to FIG. 7 that in this instance, no curved cooling fin 16 is present that receives battery cells 10 of a row between its arms. Rather, two cooling fins 16 are provided per battery cell row, which cooling fins abut opposing external peripheral sides of each cell housing 12 and clamp the cells 10 between them.

By arranging transverse canals above and below the battery cells, lateral space is saved, thereby enabling a more compact battery pack.

The canals 28 extend almost entirely over the entire outer surface of the cooling fins 16 in substantially horizontal sections lying one atop the other, that is to say likewise in a concertina manner. Other canal 28 courses are of course also conceivable. It would be possible, for example, to provide a plurality of canals lying one atop the other per cooling fin 16.

During operation, the battery cells 10 heat up, a large part of the heat energy generated being removed by means of the cell housing 12 into the abutting cooling fins 16 and by means of the coolant flowing though the canals 28.

The battery cells in the embodiment according to FIG. 8 are right parallelepipeds. Each longitudinal side of the right parallelepiped of this embodiment preferably has its own individual cooling fin 16 provided thereon with a canal 28 running in a concertina manner.

Inlet pipe and outlet pipe 30, 32 terminate on the same sides of the associated cooling fin 16.

In the embodiment according to FIGS. 8 to 11, the battery cells 10 are not circularly cylindrical but rather right parallelepiped in form. Each longitudinal side is provided with its own cooling fin 16 that has one or a plurality of canals 28 between the walls 18, 20. For parts or sections that have a similar function, the previously supplied reference numbers are used. This embodiment is characterized by a minimal construction breadth of the battery cell stack. Alternatively, the cooling fins 16 on both sides of a battery cell row can also be connected or integrally merge into one another.

The invention claimed is:

1. A drive battery assembly of an electric, fuel cell or hybrid vehicle having a plurality of battery cells (10), which are outwardly closed by their own individual cell housings (12) and are combined into a cell stack, and at least one cooling fin (16) that planarly abuts the cell housing (12), wherein the at least one cooling fin (16) is formed from two unformed sheet metal sheets and is, at least in sections, double-walled and has walls (18, 20) that are distanced in sections and wherein the separated region forms a canal (28) that guides a coolant in order to remove heat energy from the battery cells (10).

2. The drive battery assembly as claimed in claim 1, wherein the cooling fin (16) presses against the cell housing (12).

3. The drive battery assembly as claimed in claim 1, wherein the cooling fin (16) hugs the periphery of at least one cell housing (12) by means of a press fitting.

4. The drive battery assembly as claimed in claim 1, wherein the battery cells (10) have a longitudinal axis (26) and the at least one cooling fin (16), when regarded in the direction of the longitudinal axis (26), abuts the periphery of the cell housing (12) over more than 90 degrees.

5. The drive battery assembly as claimed in claim 1, wherein at least 40 percent of the external peripheral surface of the cell housing (12) is in contact with the at least one cooling fin (16).

6. The drive battery assembly as claimed in claim 1, wherein the battery cells (10) are clamped between a plurality of cooling fins (16) or cooling fin sections that engage opposing outer peripheral sections of the cell housing (12).

7. The drive battery assembly as claimed in claim 1, wherein the cell housings (12) are cylindrical and the cooling fin (16) extends in a concertina manner along the cells (10) of one or different rows.

8. The drive battery assembly as claimed in claim 1, wherein the sheet metal sheets are connected to each other in a materially engaged manner or by shaping.

9. The drive battery assembly as claimed in claim 1, wherein a depression for forming the canal (28) is formed in only one of the sheet metal sheets.

10. The drive battery assembly as claimed in claim 1, wherein the canal (28) extends upward and downward in the longitudinal direction of the cells (10).

11. The drive battery assembly as claimed in claim 1, wherein the at least one cooling fin (16) engages at least a plurality of cell housings (12) of a row of battery cells (10) and is curved in such a manner that it abuts opposing sections of its associated cell housing (12).

12. The drive battery assembly as claimed in claim 1, wherein the at least one cooling fin (16) has on one side of the cell housing (12) more than two canal sections that run adjacent one another or a plurality of canals (28, 28').

13. The drive battery assembly as claimed in claim 1, further comprising fastening means (38) for mutual positional fixing of opposing cooling fins (16) or fin sections.

14. The drive battery assembly as claimed in claim 2 wherein the at least one cooling fin (16) hugs the periphery of at least one cell housing (12) by means of a press fitting.

15. The drive battery assembly as claimed in claim 14, wherein the battery cells (10) have a longitudinal axis (26) and the at least one cooling fin (16), when regarded in the direction of the longitudinal axis (26), abuts the periphery of the cell housing (12) over more than 90 degrees.

16. The drive battery assembly as claimed in claim 4, wherein at least 40 percent of the external peripheral surface of the cell housing (12) is in contact with at least one cooling fin (16).

17. The drive battery assembly as claimed in claim 8 wherein a depression for forming the canal (28) is formed in only one of the sheet metal sheets.

18. A drive battery assembly of an electric, fuel cell or hybrid vehicle having a plurality of battery cells (10), which are outwardly closed by their own individual cell housings (12) and are combined into a cell stack, and at least one cooling fin (16) that planarly abuts the cell housing (12), wherein the at least one cooling fin (16) is, at least in sections, double-walled and has walls (18, 20) that are distanced in sections and wherein the separated region forms a canal (28) that guides a coolant in order to remove heat energy from the battery cells (10), and wherein the canal (28) is formed by a depression in only one of the walls (18, 20).

19. The drive battery assembly as claimed in claim 18, wherein the battery cells (10) have a longitudinal axis (26) and the at least one cooling fin (16), when regarded in the direction of the longitudinal axis (26), abuts the periphery of the cell housing (12) over more than 90 degrees.

20. The drive battery assembly as claimed in claim 1, wherein the at least one cooling fin (16) has on one side of the cell housing (12) more than two canal sections that run adjacent one another or a plurality of canals (28, 28').

* * * * *